July 15, 1969    H. W. WESSELLS III, ET AL    3,455,595
AUTOMOBILE BODY SIDE SILL CONSTRUCTION
Filed Nov. 8, 1967    3 Sheets-Sheet 1

INVENTORS
HENRY W. WESSELLS, III
WALTER S. EGGERT, JR.

ATTORNEY

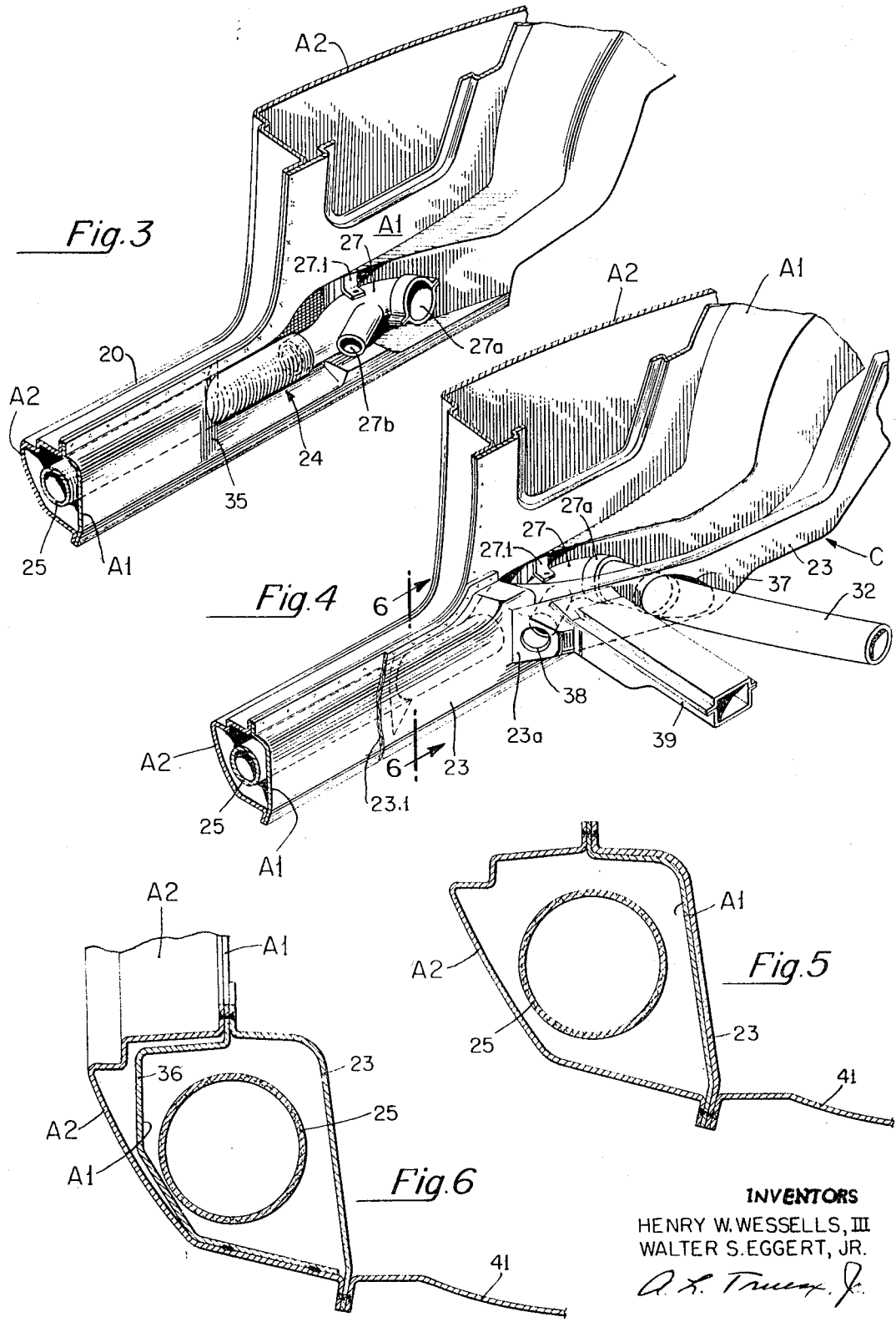

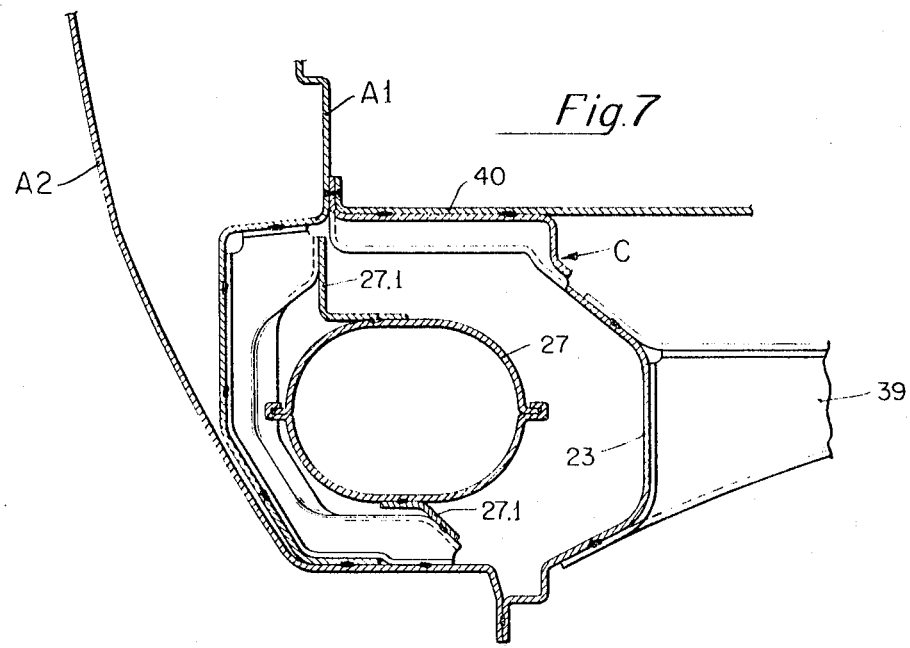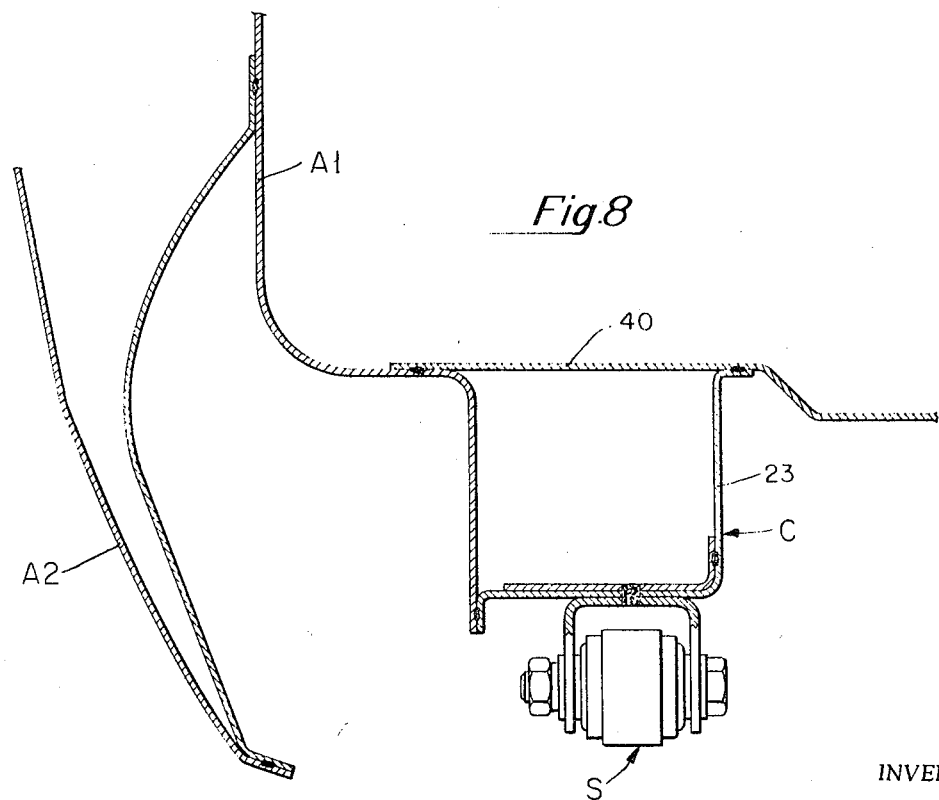

United States Patent Office 3,455,595
Patented July 15, 1969

3,455,595
AUTOMOBILE BODY SIDE SILL CONSTRUCTION
Henry W. Wesselis III, Paoli, and Walter S. Eggert, Jr., Philadelphia, Pa., assignors to The Budd Company, Philadelphia, Pa., a corporation of Pennsylvania
Filed Nov. 8, 1967, Ser. No. 681,469
Int. Cl. B62d 25/00
U.S. Cl. 296—28                                    7 Claims

ABSTRACT OF THE DISCLOSURE

A unitized vehicle body in which the side sills are formed to accommodate a heating-ventilating system and the inner uniside blends from forming an inner portion of the side sill to an outer portion of the side sill and also forms a portion of the rear frame.

---

This invention relates to automobile body having a uniside sill construction for accommodating a heating-ventilating system and providing a connection for the rear frame and has for an object the provision of improvements in this art.

The general type of automobile body with which the invention is concerned is that in which the drive motor or engine and wheel supports are mounted on a rear underbody frame; in which unitized side panels with inner and outer panel members on each side are provided with bottom side sill structures; in which a simple and efficient transition structure between the side sills and rear underbody frame is provided; in which air ducts from a conditioning source of air are connected to exhaust locations; in which the side sills and their transition structure provide for the accommodation of the air ducting; and in which the inner uniside provides a portion of the rear underbody frame.

According to the present invention, the side sill transition structure includes inner side panel sill structure with an offset or cross-over from inside to outside at the transition zone between the front and rear sill structure and a structure in which the sill structure of the rear underbody frame provides a very strong connection and which leaves the rear sill structure of the side panels open on the inner side for lapping and attachment of the front end portions of the side sill members of the rear underbody frame.

Also, the transition portions of the side panel sill structure and of the rear underbody frame sill structure are designed for the convenient assembly of transition portions of the sill structures, with the ducts installed in the side panel sill structures, and without any substantial loss of strength at the transition zones.

Accordingly, one of the particular objects of the invention is to provide a unitized body construction with an improved transition construction between the sill portions on the side panels and the sill portions of the rear underbody frame.

Another object is to provide such improved transition construction which will accommodate fluid ducting elements while maintaining adequate sill strength.

Another object is to provide side panel structure which will accommodate fluid ducting elements while providing for convenience of structural sub-assemblies.

Another object is to provide a rear frame structure in which a continuation of the inner uniside is connected to the rear underbody frame for providing a portion of the rear frame.

The above and other objects of the invention as well as various novel features and advantages will be apparent from the following description of an exemplary embodiment, reference being made to the accompanying drawings, wherein:

FIG. 3 is a perspective view of part of the right hand side panel as seen from the inside;

FIG. 4 is a view similar to FIG. 3 but with the rear underbody frame installed;

FIG. 5 is an enlarged vertical transverse section taken on the line 5—5 of FIG. 1, in the direction of the arrows, showing the transition portion of the side sill construction;

FIG. 6 is an enlarged vertical transverse section taken on the line 6—6 of FIG. 4, in the direction of the arrows, showing the treatment of the side panel and sill of the rear underbody frame rearwardly of the transition zone;

FIG. 7 is an enlarged vertical transverse section taken on the line 7—7 of FIG. 1, in the direction of the arrows;

FIG. 8 is an enlarged vertical transverse section taken on the line 8—8 of FIG. 1, in the direction of the arrows.

Figure 1:
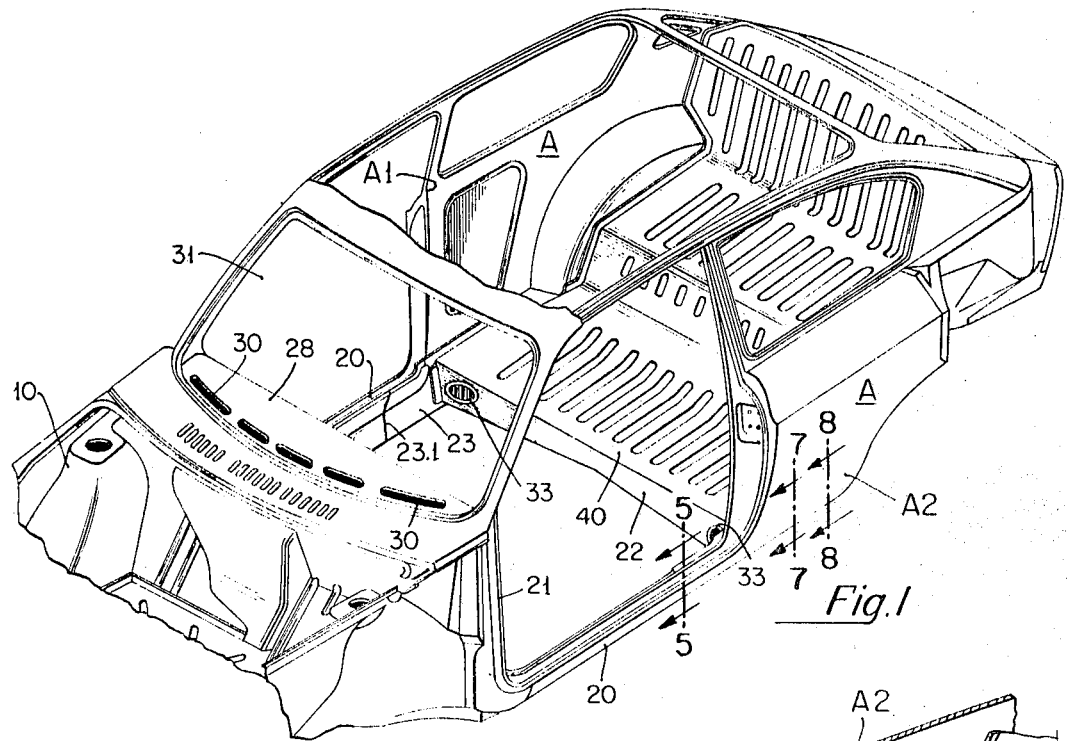
FIG. 1 is a front-to-side perspective view of the passenger compartment and rear portions of an automobile body embodying the invention.

Referring to FIG. 1, the body comprises a front end assembly 10, connected to the rear underbody C by left and right hand side panels A. Each side panel A includes an inner side panel member A1 and an outer side panel member A2 which at the bottom form side sill portions 20 extending from the forward A-post portion 21 to a transition zone in the region of the vertical front panel 22 of the rear seat. The right and left side panels are largely identical in mirror reverse, hence at times one will be shown instead of the other to avoid switching from right hand to left hand views of panels.

The side sills in the transition zone are continued in the side sills 23 of the rear underbody frame C which carries the wheel supports A (FIG. 8) and rear engine mounting (not shown). It will be understood that a source of air such as from an engine heat exchanger or air conditioning unit will provide the supply of air which is conveyed in ducts 24 in the side sills.

Previously, air has been conducted through side sills but the present structure and arrangements are believed to be entirely different from anything heretofore known.

Figure 2:
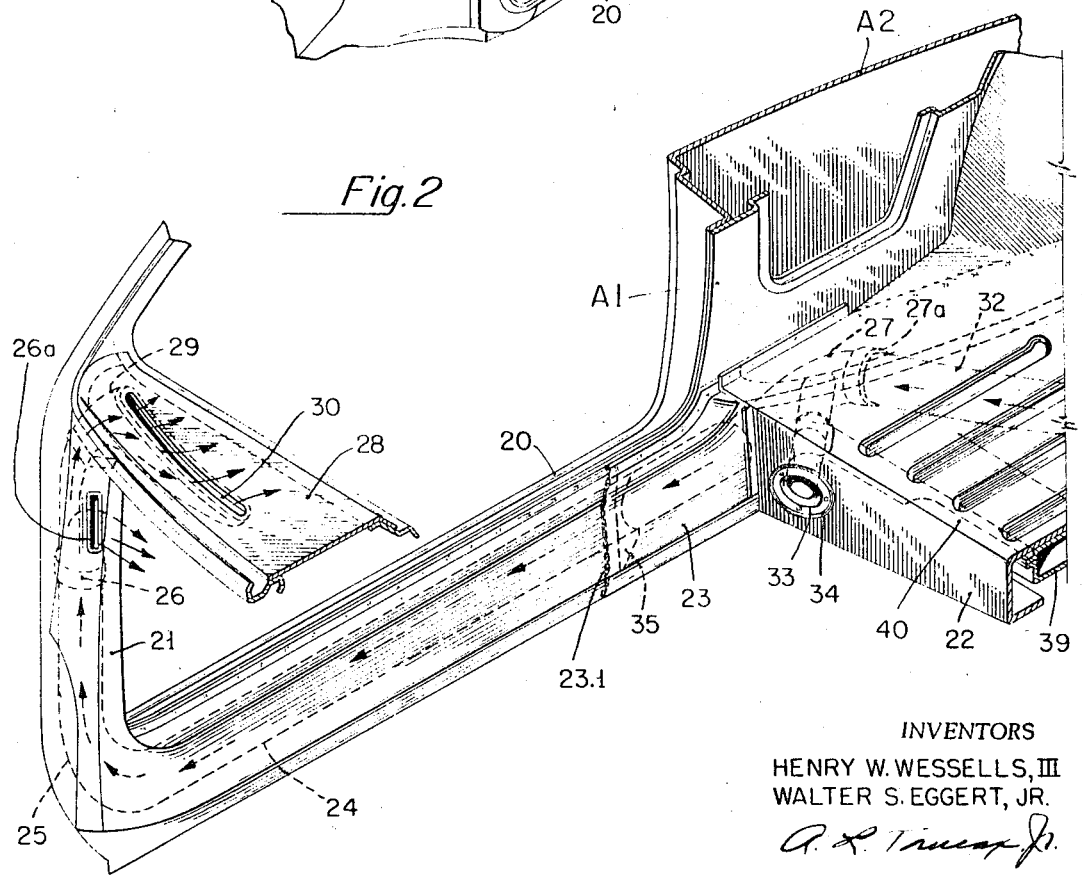
FIG. 2 is a partial perspective view of the lower portion of the right hand side of the body as seen from the outside.

Referring now to FIGS. 2–4, there is an air duct 24 on each side and for ease of assembly, certainty of full enclosure, and simplicity of construction, a flexible hose 25 which is bendable but rigid in section is secured for the greater part of its length, as by clips, in the outwardly facing concave channel of an inner side panel A1. The channel continues at the front end from the sill portion up the front A-post portion.

A front hose terminal fitting 26 is connected to the front upper end of the hose and a rear hose terminal fitting 27 is connected to the rear end of the hose. The fitting 27 is held in position by any suitable means, as by anchor members 27.1.

The fitting 26 is provided with a side opening connection 26a for supplying conditioned air into the front passenger compartment just below the dash 28 and with an end opening connection 26b for supplying air to a duct 29 which has an opening 30 for supplying air through the dash to the inner surface of the windshield 31 at the bottom and near the outer sides about in line with the passengers' vision.

As best seen in FIGS. 2, 3 and 4, the fitting 27 is elbow-shaped with a larger rear opening connection 27a which faces inwardly and somewhat rearwardly for connection with a hose line 32 from the air source and with a smaller forwardly and inwardly directed opening connection 27b for connection with a short outlet duct 33 which extends through an opening 34 in the riser 22 of the rear seat support structure for delivering conditioned air to the rear seating area.

The duct transition fitting 27 is located in the transition zone of the side sill and this arrangement is convenient not only for the duct system but has structural advantages independently of the ducting system. It is particularly advantageous when it can serve both uses and the structure has been designed to have great strength even when the duct line is run through.

At the rear transition zone on each side the bottom of the outwardly open sill channel of the inner side panel A1, which from the front end of the duct space and rearwardly is located on the inner side of the main body wall of the inner side panel is moved to the outer side in an inclined jog web 35, having a hole therein for the duct, and therebehind on the outer side is provided with an inwardly-facing convex channel-shaped rear channel extension 36.

This leaves the inner side at the rear end of the side panel sill structure open for the insertion, securement and connection of the transition duct fitting 27. Subsequently the front ends 23 of the side sill portions of the rear underbody frame are brought up over the inside space thus left and are connected to the side panel sill structure both along the longitudinal flanges and across the web of the channel of the inner side panels, as by welding 23.1 (FIG. 2) for reinforcing the transition area. The web 35 acts as a bulkhead in the sill.

The rear underbody frame sill portions 23 are provided with apertures 37 for hoses 32 to the air source end opening connections 27a and apertures 38 in the offset portions 23a to the opening connections 27b; and the rear underbody frame is reinforced here by a transverse beam 39.

As seen in FIGS. 7 and 8, a deck plate for the rear seat support structure is designated for identification as 40, and a floor pan, shown in FIGS. 5 and 6 is designated as 41. The rear underbody frame C has a channel structure formed by the sill portion 23, deck plate 40 and the lower portion of the inner side panel member A1, as best seen in FIG. 8.

The present construction provides for convenience in assembling the body structure. After the inner and outer side panel members have been press-formed, the flexible air conveying duct hoses and fittings are secured in the channels of the inner side panel members, threaded through the holes in the cross-over web elements 35. Behind the web elements 35 the holes are disposed in the inwardly facing rear channels of the inner side panel members. The hoses are flexible and readily bendable along the curved connection portion between the longitudinal side sill channel portions and the upstanding A-post portions of the channel in the inner side panel members. The hoses and end fittings are secured in the channels by the means heretofore described. The end branch connections or fittings 26 and 27 are connected to the ends of the hoses and then secured in position on the inner side panel members.

The outer side panel members are then secured, as by welding, to the inner side panel members.

The rear underbody frame side sill portions are now brought into position and secured to the side panels and the deck plate 40.

The end connection fittings have their branch openings directed toward openings in the A-posts and in the rear underbody side sills. The end fittings are of such a nature that branch line connections can readily be made by inserting duct connection fittings through the openings. At a later time, as convenient, these connections are made to complete the air duct system.

It is thus seen that a very simple, strong body construction is provided; that it accommodates the air ducting system in a convenient manner and without undue weakening therefor; and that the construction provides for very simple and convenient assembly of the body and duct system parts.

While one embodiment of the invention has been illustrated and described in detail, it will be understood that there may be various embodiments and modifications within the general scope of the invention.

We claim:

1. In combination in a vehicle body having a rear underbody frame for supporting a motor and rear wheel supports, a rear deck plate secured to said rear underbody frame and forming a portion thereof, a front end assembly for supporting front wheel supports and a pair of uniside members interconnecting said front end assembly and said rear underbody frame; each of said uniside members including an inner panel and an outer panel, said panels having upper portions for forming body side panels and channel portions formed on the lower edges thereof, said inner panel channel portion including a front concave web portion facing outwardly of said body and disposed inwardly of the main portion of said inner panel, a rear convex web portion facing inwardly of said body and disposed outwardly of the body portion of said inner panel and a transition zone interconnecting said web portions, and said rear underbody frame having rear sills extending forwardly of each of said transition zones for being secured to said inner panels for reinforcing said transition zones.

2. A body construction as claimed in claim 1 wherein each of said outer panel channel portions cooperates with said channel portions of said inner panels and said rear underbody frame for forming a side sill on each side of said body.

3. The body construction as claimed in claim 1, wherein said rear underbody frame includes a rear channel structure having said rear sill secured to said rear deck plate.

4. A body construction as claimed in claim 1 wherein a side sill is formed on each side of said body by the cooperation of said channel portions of said inner and said outer panels and said rear underbody frame, and said transition zone includes a crossover web portion having an aperture formed therein, said crossover web portion interconnecting said convex and said concave web portions of said inner panel.

5. A body construction as claimed in claim 4 including a fluid duct extending within said side sill and passing through said aperture, and outlet means extending into said body and connected to said fluid duct whereby conditioned air may be passed from the rear mounted engine into the interior of the body.

6. A body construction as claimed in claim 1, wherein said rear underbody frame include a rear channel structure having said rear sill secured to said inner panel.

7. The body construction as claimed in claim 6 further having said rear channel structure being comprised of said rear sill secured to said rear deck plate and said rear deck plate secured to said inner panel.

References Cited

UNITED STATES PATENTS

| 2,074,158 | 3/1937 | Avery | 280—106 |
| 2,256,885 | 9/1941 | Bruss | 280—106 |
| 2,875,841 | 3/1959 | Henderson | 280—106 X |
| 3,116,803 | 1/1964 | Buchwald | 280—106 X |

BENJAMIN HERSH, Primary Examiner

J. A. PEKAR, Assistant Examiner

U.S. Cl. X.R.

98—2